(12) United States Patent  Kim

(10) Patent No.: US 11,724,735 B2
(45) Date of Patent: Aug. 15, 2023

(54) STEERING CONTROL APPARATUS, STEERING CONTROL METHOD, AND STEERING APPARATUS

(71) Applicant: Mando Corporation, Pyeongtaek-si (KR)

(72) Inventor: Jung-yeol Kim, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 155 days.

(21) Appl. No.: 17/416,212

(22) PCT Filed: Dec. 11, 2019

(86) PCT No.: PCT/KR2019/017507
§ 371 (c)(1),
(2) Date: Jun. 18, 2021

(87) PCT Pub. No.: WO2020/130479
PCT Pub. Date: Jun. 25, 2020

(65) Prior Publication Data
US 2022/0055685 A1    Feb. 24, 2022

(30) Foreign Application Priority Data

Dec. 19, 2018  (KR) .......................... 10-2018-0164991

(51) Int. Cl.
*B62D 5/04*    (2006.01)
*B62D 6/00*    (2006.01)

(52) U.S. Cl.
CPC ........... *B62D 6/002* (2013.01); *B62D 5/0481* (2013.01)

(58) Field of Classification Search
CPC .... B62D 6/002; B62D 5/0481; B62D 15/025; B60Q 1/34; B60W 10/20; B60W 30/045; B60W 40/12; B60W 50/00; B60W 50/14
See application file for complete search history.

(56) References Cited

U.S. PATENT DOCUMENTS 4,700,589 A * 10/1987 Coronel .............. F16H 37/0806
                                                        475/330
4,773,012 A *  9/1988 Ito .......................... B62D 7/159
                                                        701/42

(Continued)

FOREIGN PATENT DOCUMENTS

CN    110660258 B  *  4/2022  ............. G08B 21/06
CN    108693533 B  *  9/2022  ........... B62D 15/025

(Continued)

OTHER PUBLICATIONS

"Driver-vehicle closed-loop simulation of differential drive assist steering control system for motorized-wheel electric vehicle;" Wang et al., 2009 IEEE Vehicle Power and Propulsion Conference (pp. 564-571); Publication Date: Sep. 1, 2009. (Year: 2009).*

(Continued)

*Primary Examiner* — Khoi H Tran
*Assistant Examiner* — Jorge O Peche
(74) *Attorney, Agent, or Firm* — Hauptman Ham, LLP

(57) ABSTRACT

The present disclosure provides a steering control apparatus, a steering control method, and a steering apparatus. Specifically, the steering control apparatus comprises: a reception unit for receiving steering correction condition information; a steering correction determination unit for determining whether to correct steering on the basis of the steering correction condition information; an angle correction value calculation unit for, when it is determined to correct the steering, determining correction parameters of the steering correction condition information and calculating an angle correction value by using the correction parameters of the steering correction condition information; and a signal generating unit for generating a motor control signal by determining whether to generate the motor control signal which is based on the angle correction value according to a (Continued)

result of comparison of the angle correction value to a reference value.

16 Claims, 7 Drawing Sheets

(56) References Cited

U.S. PATENT DOCUMENTS

| | | | | |
|---|---|---|---|---|
| 4,967,865 A * | 11/1990 | Schindler | | B62D 7/159 180/408 |
| 5,285,867 A * | 2/1994 | Pedersen | | B62D 1/22 475/329 |
| 5,492,348 A * | 2/1996 | Shaw | | B62D 7/1509 180/413 |
| 5,884,724 A * | 3/1999 | Bohner | | B62D 6/002 180/402 |
| 6,053,270 A * | 4/2000 | Nishikawa | | B62D 1/10 701/41 |
| 7,528,730 B2 * | 5/2009 | Gut | | B62D 15/025 340/963 |
| 7,617,033 B2 * | 11/2009 | Katou | | B62D 5/0469 180/443 |
| 8,698,639 B2 * | 4/2014 | Fung | | B60T 8/172 340/576 |
| 9,308,935 B2 * | 4/2016 | Ohno | | B62D 15/0215 |
| 9,568,608 B2 * | 2/2017 | Ono | | G01S 17/931 |
| 9,669,866 B2 * | 6/2017 | Kunihiro | | B62D 5/0481 |
| 10,065,639 B2 * | 9/2018 | Taniguchi | | B62D 15/025 |
| 10,597,076 B2 * | 3/2020 | Takashima | | B62D 6/002 |
| 2002/0007239 A1 * | 1/2002 | Matsumoto | | B60K 23/0808 701/41 |
| 2002/0169531 A1 * | 11/2002 | Kawazoe | | B62D 5/0463 180/443 |
| 2003/0028303 A1 * | 2/2003 | Sebastian | | B62D 7/159 180/443 |
| 2003/0051560 A1 * | 3/2003 | Ono | | B62D 15/02 73/862.08 |
| 2003/0078711 A1 * | 4/2003 | Klein | | B62D 7/159 701/41 |
| 2003/0105563 A1 * | 6/2003 | Oshima | | B60L 15/2036 701/41 |
| 2003/0120414 A1 * | 6/2003 | Matsumoto | | B60W 30/12 180/170 |
| 2004/0262063 A1 * | 12/2004 | Kaufmann | | B62D 15/025 180/169 |
| 2005/0107931 A1 * | 5/2005 | Shimakage | | G08G 1/167 701/41 |
| 2005/0273235 A1 * | 12/2005 | Ohta | | B62D 6/003 701/41 |
| 2006/0086561 A1 * | 4/2006 | Hidaka | | B62D 15/025 701/41 |
| 2009/0024279 A1 * | 1/2009 | Takeda | | B60W 50/16 701/41 |
| 2009/0024293 A1 * | 1/2009 | Takenaka | | B62D 6/002 701/71 |
| 2009/0069979 A1 * | 3/2009 | Yamashita | | B62D 5/0463 701/42 |
| 2009/0112406 A1 * | 4/2009 | Fujii | | B62D 5/0463 701/42 |
| 2009/0326761 A1 * | 12/2009 | Nitta | | B60T 8/1755 701/41 |
| 2010/0114405 A1 * | 5/2010 | Elston | | B60W 30/09 701/1 |
| 2010/0228444 A1 * | 9/2010 | Kojo | | B60W 30/18145 701/41 |
| 2010/0332083 A1 * | 12/2010 | Yanagi | | B62D 7/159 701/42 |
| 2011/0015850 A1 * | 1/2011 | Tange | | B60T 8/17557 701/116 |
| 2011/0040446 A1 * | 2/2011 | Taguchi | | B62D 15/025 701/41 |
| 2012/0123642 A1 * | 5/2012 | Kojo | | B62D 15/025 701/41 |
| 2012/0283912 A1 * | 11/2012 | Lee | | B62D 1/286 701/41 |
| 2012/0303218 A1 * | 11/2012 | Tamura | | B62D 1/046 701/41 |
| 2015/0191199 A1 * | 7/2015 | Tsubaki | | B62D 6/10 701/42 |
| 2015/0217801 A1 * | 8/2015 | Takeda | | B62D 5/0463 701/42 |
| 2015/0225014 A1 * | 8/2015 | Takeda | | G06V 20/588 701/41 |
| 2015/0225015 A1 * | 8/2015 | Takeda | | B62D 6/008 701/41 |
| 2015/0225017 A1 * | 8/2015 | Takeda | | G06V 20/588 701/41 |
| 2015/0232124 A1 * | 8/2015 | Takeda | | B62D 6/04 701/42 |
| 2015/0246686 A1 * | 9/2015 | Takeda | | G06V 20/588 701/41 |
| 2015/0246687 A1 * | 9/2015 | Takeda | | B62D 15/025 701/41 |
| 2015/0266504 A1 * | 9/2015 | Kunihiro | | B62D 5/0481 701/41 |
| 2015/0274203 A1 * | 10/2015 | Takeda | | B62D 15/025 701/42 |
| 2015/0274206 A1 * | 10/2015 | Takeda | | B62D 6/008 701/41 |
| 2015/0329142 A1 * | 11/2015 | Takeda | | B60R 1/00 701/41 |
| 2015/0344068 A1 * | 12/2015 | Taniguchi | | B62D 15/025 701/41 |
| 2015/0353127 A1 * | 12/2015 | Takeda | | B62D 5/0469 701/41 |
| 2015/0375777 A1 * | 12/2015 | Endo | | B62D 5/0463 701/41 |
| 2016/0046321 A1 * | 2/2016 | Takashima | | B62D 7/159 701/41 |
| 2016/0159394 A1 * | 6/2016 | Ryu | | B62D 5/0493 701/41 |
| 2016/0280267 A1 * | 9/2016 | Lavoie | | B62D 5/0409 |
| 2017/0088176 A1 * | 3/2017 | Tamura | | B62D 15/025 |
| 2017/0369095 A1 * | 12/2017 | Kodera | | B62D 5/0421 |
| 2018/0022383 A1 * | 1/2018 | Kunihiro | | B62D 6/005 701/41 |
| 2018/0086341 A1 * | 3/2018 | Taniguchi | | B62D 6/008 |
| 2018/0201306 A1 * | 7/2018 | Tsubaki | | B62D 1/286 |
| 2019/0152520 A1 * | 5/2019 | Obermüller | | B62D 5/008 |
| 2020/0128739 A1 * | 4/2020 | Suleman | | A01D 41/1278 |
| 2020/0133262 A1 * | 4/2020 | Suleman | | A01D 41/1217 |
| 2020/0156698 A1 * | 5/2020 | Tsubaki | | B62D 5/0463 |
| 2020/0324812 A1 * | 10/2020 | Matsuo | | B62D 5/0424 |
| 2021/0016827 A1 * | 1/2021 | Suzuki | | B62D 5/006 |
| 2022/0055685 A1 * | 2/2022 | Kim | | B60W 40/12 |
| 2022/0063718 A1 * | 3/2022 | Kobayashi | | B62D 5/0463 |
| 2022/0315105 A1 * | 10/2022 | Kuragaki | | B62D 15/025 |
| 2022/0332366 A1 * | 10/2022 | Sonoda | | B62D 6/002 |
| 2023/0120193 A1 * | 4/2023 | Kitazume | | B62D 5/0457 180/446 |

FOREIGN PATENT DOCUMENTS

| | | | | |
|---|---|---|---|---|
| CN | 217751330 U | * | 11/2022 | |
| DE | 102019213370 A1 | * | 3/2020 | ............ B60W 10/20 |
| DE | 102019124655 A1 | * | 3/2021 | ............ B60W 30/12 |
| DE | 102022204559 A1 | * | 12/2022 | ............ B62D 5/006 |
| EP | 1199237 A1 | * | 4/2002 | ............ B61C 15/14 |
| EP | 1661791 A2 | * | 5/2006 | ............ B62D 5/008 |
| EP | 1969916 A1 | * | 9/2008 | ........... A01B 69/008 |
| EP | 2921374 A2 | * | 9/2015 | ........... B62D 5/0463 |
| EP | 2921374 B1 | * | 4/2018 | ........... B62D 5/0463 |
| EP | 3434825 A1 | * | 1/2019 | |
| JP | H07-64222 B2 | | 7/1995 | |
| JP | 2000502636 A | * | 3/2000 | |
| JP | 3554841 B2 | * | 8/2004 | ............ B62D 5/003 |
| JP | 2006-338200 A | | 12/2006 | |
| JP | 6882958 B2 | * | 6/2021 | |

(56) References Cited

FOREIGN PATENT DOCUMENTS

| KR | 100411115 B1 | * | 12/2003 | |
|---|---|---|---|---|
| KR | 10-2012-0017852 A | | 2/2012 | |
| KR | 10-2016-0068144 A | | 6/2016 | |
| KR | 10-2017-0119877 A | | 10/2017 | |
| KR | 10-2017-0136765 A | | 12/2017 | |
| KR | 20200076654 A | * | 6/2020 | |
| WO | WO-2016192806 A1 | * | 12/2016 | ............ B60T 8/1755 |
| WO | WO-2022100838 A1 | * | 5/2022 | |
| WO | WO-2022109386 A1 | * | 5/2022 | |
| WO | WO-2022140657 A1 | * | 6/2022 | ...... B60W 30/18163 |

OTHER PUBLICATIONS

"A method for a driver substitute in intelligent driving system based on simulation;" Chu et al.; 2011 International Conference on Mechatronic Science, Electric Engineering and Computer (MEC) (pp. 1594-1597); Publication Date: Aug. 1, 2011. (Year: 2011).*

"Emergency Steering Evasion Assistance Control Based on Driving Behavior Analysis;" Zhao et al., IEEE Transactions on Intelligent Transportation Systems (vol. 20, Issue: 2, pp. 457-475); Publication Date: Mar. 24, 2018. (Year: 2018).*

International Search Report dated May 19, 2020, corresponding to International Application No. PCT/KR2019/017507.

* cited by examiner

STEERING CONTROL APPARATUS, STEERING CONTROL METHOD, AND STEERING APPARATUS

CROSS-REFERENCE TO RELATED APPLICATION

The present application is a national stage filing under 35 U.S.C § 371 of PCT application number PCT/KR2019/017507 filed on Dec. 11, 2019 which is based upon and claims the benefit of priorities to Korean Patent Application No. 10-2018-0164991 filed on Dec. 19, 2018, in the Korean Intellectual Property Office. Both of the aforementioned applications are hereby incorporated by reference in their entireties.

TECHNICAL FIELD

The present disclosure relates to a steering control apparatus and steering control method, and steering apparatus.

BACKGROUND ART

In general, an electric power steering system (EPS) may be used for a vehicle as a means for reducing the steering force of a steering wheel (handle) to ensure the stability of the steering state. The electric power steering system (EPS) drives a motor by an electronic control unit (ECU) according to the driving conditions of the vehicle detected by the vehicle speed sensor and torque sensor, thereby providing the driver with optimal steering conditions in which a light and comfortable steering feel is provided during low-speed driving, a heavy steering feel and good directional stability is provided in high-speed driving, and a rapid steering capability is provided in an emergency situation.

The vehicle may additionally include various functions for assisting the driver's steering. For example, there may be a lane departure warning system (LDWS) for recognizing the lane in which the vehicle is driving and providing a warning notification when the vehicle departs from the lane without the driver's intention to change the lane. In addition to the LDWS, there may be also a tracking function for controlling the steering so that the vehicle can move into the existing driving lane when a vehicle pulls without intention to change lanes. In order to implement such a function, there is a need for a specific control method for controlling the steering of the vehicle by accurately reflecting information on the driving intention of the driver and the driving state of the vehicle.

DISCLOSURE

Technical Problem

In this background, the present disclosure intends to efficiently generate a motor control signal for controlling a steering assistance motor in order to provide various driver assistance functions.

Technical Solution

In order to achieve the above object, in one aspect, the present disclosure provides a steering control apparatus including a receiver for receiving steering correction condition information, a steering correction determiner for determining whether to perform steering correction based on the steering correction condition information, an angle correction value determiner for, if it is determined that the steering correction is to be performed, determining a correction parameter of the steering correction condition information, and for calculating an angle correction value using the correction parameter of the steering correction condition information, and a signal generator for, according to the comparison result of the angle correction values and a reference values, determining whether to generate a motor control signal based on the angle correction values to generate the motor control signal.

In another aspect, the present disclosure provides an steering control method including receiving steering correction condition information, determining whether to perform steering correction based on the steering correction condition information, determining, if it is determined that the steering correction is to be performed, a correction parameter of the steering correction condition information, and calculating an angle correction value using the correction parameter of the steering correction condition information, and generating, according to the comparison result of the angle correction values and a reference values, a motor control signal by determining whether to generate the motor control signal based on the angle correction values.

In another aspect, the present disclosure provides a steering apparatus including a steering motor including at least two motors configuring to have different gear ratios of a worm and a worm wheel, and an electronic control unit for controlling the steering motor, wherein the electronic control unit configuring to, receive steering correction condition information, determine whether to perform steering correction based on the steering correction condition information, determine, if it is determined that the steering correction is to be performed, a correction parameter of the steering correction condition information, and calculate an angle correction value using the correction parameter of the steering correction condition information, and generate, according to the comparison result of the angle correction values and a reference values, a motor control signal by determining whether to generate the motor control signal based on the angle correction value, and wherein the motor control signal is transmitted to a motor having the smallest gear ratio among the at least two motors.

Advantageous Effects

As described above, according to the present disclosure, it is possible to provide various driver assistance functions by using a motor for providing steering assistance.

MODE FOR DISCLOSURE

Figure 1:
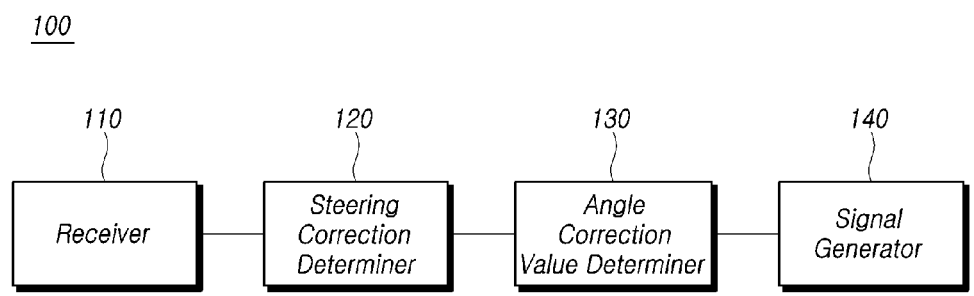
FIG. 1 is a diagram illustrating a configuration of a steering control apparatus according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified.

FIG. 1 is a diagram illustrating a configuration of a steering control apparatus according to an embodiment of the present disclosure.

Referring to FIG. 1, a steering control apparatus 100 includes a receiver 110 for receiving steering correction condition information, a steering correction determiner 120 for determining whether to perform steering correction based on the steering correction condition information, an angle correction value determiner 130 for, if it is determined that the steering correction is to be performed, determining a correction parameter of the steering correction condition information, and for calculating an angle correction value using the correction parameter of the steering correction condition information, and a signal generator 140 for, according to the comparison result of the angle correction values and a reference values, determining whether to generate a motor control signal based on the angle correction values to generate the motor control signal.

The receiver 110 of the steering control apparatus 100 receives steering correction condition information.

Here, the steering correction condition information may include at least one of steering angle information, steering angular velocity information, steering angular acceleration information, steering torque information, direction indicator information, blind spot detection (BSD) function operation information, or vehicle speed information. The steering angle information, the steering angular velocity information and the steering angular acceleration information may be information detected and processed by a steering angle sensor, the steering torque information may be information detected and processed by a steering torque sensor, the direction indicator information may be information on whether a turn signal lamp for changing a lane of a vehicle is turned on, the blind spot detection (BSD) function operation information may be information on whether the vehicle's blind spot detection function is activated, and the vehicle speed information may be information detected and processed by a vehicle speed sensor.

The receiver 110 may receive at least one of steering angle information, steering angular velocity information, and steering angular acceleration from the steering angle sensor, and may receive the steering torque information from the steering torque sensor, and may receive the direction indicator information from a direction indication lamp module, and may receive the BSD function operation information from the BSD module, and may receive the vehicle speed information from the vehicle speed sensor.

In an embodiment, the receiver 110 of the steering control apparatus 100 may be connected to the steering angle sensor and the steering torque sensor through a wire, and may be connected to the direction indication lamp module, the BSD module and the vehicle speed sensor through CAN communication.

Optionally, the steering correction condition information may include information on the surrounding environment information of the vehicle captured by the vehicle's radar or camera, for example, information on the position or speed of objects existing in the vicinity of the vehicle, distance to the host vehicle, etc. The steering correction condition information is not limited thereto, and may include other vehicle information or external information that may be applied to steering control of the vehicle or may determine the steering intention of the driver.

The steering correction determiner 120 of the steering control apparatus 100 determines whether to perform the steering correction based on the steering correction condition information. Specifically, the steering correction determiner 120 determines whether to perform the steering correction based on at least one of steering angle information, steering angular velocity information, steering angular acceleration information, steering torque information, direction indicator information, BSD function operation information, and vehicle speed information. Here, the steering correction may means a correcting the steering of the vehicle so as for the vehicle to travel in the center of the driving lane or in a direction parallel to the driving lane if a lateral pull of the vehicle occurs in a specific direction of the driving lane against the driver's intention while driving.

In an embodiment, the steering correction determiner 120 of the steering control apparatus 100 may determine to perform the steering correction if the direction indicator is not turned on, and may determine to not perform the steering correction if the direction indicator is turned on. Since the turn-on of the direction indicator means that the driver intend to change the driving lane of the vehicle, the steering control apparatus 100 does not perform steering correction for the lateral pull of the vehicle. On the other hand, since the occurrence of the lateral pull of the vehicle occurs even if the turn indicator is not turned on may mean that the vehicle is pulled in a specific direction against the driver's intention, the steering correction determiner 120 of the steering control apparatus 100 may determine that steering correction is necessary so that the steering control apparatus 100 may perform the steering correction control.

In an embodiment, the steering correction determiner 120 of the steering control apparatus 100 may determine to perform the steering correction if the BSD function is in an on state, and may determine to not perform the steering correction if the BSD function is in an off state. Since the on-state (activation) of the BSD function means that the driver intent to change the driving lane of the vehicle, the steering control apparatus 100 does not perform steering correction with respect to the lateral pull of the vehicle. On the other hand, the occurrence of lateral pull of the vehicle even when the BSD function is off (inactived) means that the vehicle is pulled in a specific direction against the driver's intention, the steering correction determiner 120 of the steering control apparatus 100 may determine that steering correction is necessary so that the steering control apparatus 100 may perform the steering correction control.

In an embodiment, the steering correction determiner 120 of the steering control apparatus 100 may determine to perform the steering correction if the vehicle speed is equal to or greater than a first threshold, and may determine to not perform the steering correction if the vehicle speed is less than the first threshold. In the case that the vehicle is traveling at high speed, since the driving direction of the vehicle may be greatly changed with respect to a slight lateral pull of the vehicle, the steering correction determiner 120 of the steering control apparatus 100 may determine that steering correction is necessary so that the steering control apparatus 100 may perform the steering correction control.

In an embodiment, the steering correction determiner 120 of the steering control apparatus 100 may provide a warning notification for the lateral pull of the vehicle if the vehicle speed is greater than the second threshold and less than the first threshold. Here, the second threshold is set to a value smaller than the first threshold. If the vehicle is traveling at a relatively low speed, it is possible to assist the driving of the vehicle by providing a warning notification regarding the steering to the driver for the lateral pull of the vehicle.

The warning notification for the lateral pull of the vehicle may use at least one of a vehicle steering wheel vibration, a driver's seat vibration, a sound notification, and a notification using visual information. However, the warning notification is not limited thereto, and there may be utilized any method capable of drawing the driver's attention or providing the driver with a notification about the lateral pull of the vehicle.

In the steering wheel vibration of a vehicle, it is possible to prevent system resonance by using a notch filter corresponding to the steering wheel vibration frequency. Furthermore, it is possible to adjust the gain of the steering wheel vibration by varying the amplitude, frequency, and period to meet the characteristics of each vehicle. In addition, the amplitude of the steering wheel vibration may be adjusted based on the steering torque information. For example, the amplitude of the vibration may be ramped down as the steering torque is increased.

The steering control apparatus 100 may transmit a warning notification about the lateral pull of the vehicle through a CAN signal command. In one embodiment, if the steering control apparatus 100 determines that a warning notification for lateral pull of the vehicle is necessary without steering correction control, a lane departure warning system (LDWS) module may generate the CAN signal command and transmits it to the relevant module, thereby providing the warning notification about the lateral pull of the vehicle.

In an embodiment, the steering correction determiner 120 of the steering control apparatus 100 may not perform steering correction and the warning notification for lateral pull of the vehicle in the case that the vehicle speed is less than or equal to the second threshold.

In the case that it is determined to perform the steering correction by the steering correction determiner 120, the angle correction value determiner 130 of the steering control apparatus 100 may determine a correction parameter of the steering correction condition information, and may calculate the angle correction value by using the correction parameter of the correction condition information. The correction parameter of the steering correction condition information may be determined as a preset correction parameter. Alternatively, the correction parameter of the steering correction condition information may be determined as a correction parameter corresponding to the driving state of the vehicle. The correction parameter may include at least one of a steering angle, a steering angular velocity, a steering angular acceleration, a steering torque, and a vehicle speed. The angle correction value determiner 130 may calculate the angle correction value using the determined correction parameter.

In an embodiment, the angle correction value determiner 130 of the steering control apparatus 100 may determine a weight of the correction parameter of the steering correction condition information according to the steering correction condition information, and may calculate the angle correction value by using the correction parameter of the steering correction condition information and the determined weight. The weight of the correction parameter determines the degree to which steering correction is performed based on the driving state of the host vehicle. The weight of the correction parameter may be determined based on a relation to a weight value of the correction parameter according to a preset weight map or preset information on the corresponding steering correction condition of the host vehicle.

In an embodiment, the angle correction value determiner 130 of the steering control apparatus 100 may decrease the weight of the correction parameter of the vehicle speed if the vehicle speed included in the steering correction condition information is equal to or greater than a first threshold and less than a third threshold. In Contrary, if the vehicle speed is equal to or greater than the third threshold, the angle correction value determiner 130 may maintain the weight of the correction parameter of the vehicle speed as a constant value. Here, the third threshold is set to a value greater than the first threshold. Maintaining the weight of the correction parameter of the vehicle speed at a constant value even when the vehicle speed is greater than or equal to the third threshold is because, if the vehicle speed is high, the steering angle or driving angle change due to the high-speed of the vehicle is large, so that it is required the steering correction for the vehicle speed.

In an embodiment, if the steering angular velocity included in the steering correction condition information is less than a fourth threshold, the angle correction value determiner 130 of the steering control apparatus 100 may maintain the weight of the correction parameter of the steering angular velocity at a constant value. In contrary, if the steering angular velocity included in the steering correction condition information is equal to or greater than the fourth threshold, the angle correction value determiner 130 may decrease or reduce the weight of the correction parameter of the steering angular velocity. Since the driver intends to change the lane or change the driving direction if the steering angular velocity is equal to or greater than the fourth threshold, the weight of the correction parameter for the steering angular velocity is controlled to be small.

In an embodiment, the angle correction value determiner 130 of the steering control apparatus 100 may maintain the weight of the correction parameter for the steering torque at a constant value if the steering torque included in the steering correction condition information is less than a fifth threshold value, and may decrease or reduce the weight of the correction parameter for the steering torque if the steering torque included in the steering correction condition information is equal to or greater than the fifth threshold. If the steering torque of the vehicle is equal to or greater than the fifth threshold, since it means that the driver intends to change the lane or change the driving direction, the weight of the correction parameter for the steering torque is controlled to be small.

The signal generator 140 of the steering control apparatus 100 generates a motor control signal by determining whether to generate a motor control signal based on the angle correction value according to a comparison result of the angle correction value and a reference value. The motor control signal may be a torque or current provided to the steering motor unit to correct steering of the vehicle.

In one embodiment, the receiver 110 of the steering control apparatus 100 receives a LDWS angle correction value from a lane departure warning system (LDWS) module. The signal generator 140 may generate the motor control signal based on the angle correction value if the angle correction value is equal to or less than the LDWS angle correction value. Since the steering motor unit is controlled by a motor control signal based on the angle correction value if the angle correction value is less than or equal to the LDWS angle correction value, it is possible to realize the precise steering control by reflecting the driving state of the vehicle rather than the LDWS indication value.

The steering control apparatus 100 further includes a signal transmitter (not shown) for transmitting the generated motor control signal to the steering motor unit.

In one embodiment, the steering motor unit may include at least two motors, and a gear ratio of a worm and a worm wheel connected to each of the at least two motors is different from each other. For example, two worms may be connected to one worm wheel. Here, each worm is controlled by a different motor, and two motors control each worm to provide rotational force to one worm wheel. In addition, the gear ratio of the first worm and the worm wheel and the gear ratio of the second worm and the worm wheel may be configured to be different from each other.

Meanwhile, the signal transmitter may transmit the motor control signal to any one of the above-described at least two motors. For example, the signal transmitter may transmit the control signal to a motor having the largest gear ratio. As another example, the signal transmitter may transmit the motor control signal to a motor having the smallest gear ratio.

Here, the motor having a large gear ratio of the worm and the worm wheel may provide a reference torque for steering control as the main motor, and the motor having the small gear ratio of the worm and the worm wheel may provide additional torque for steering correction control as a sub-motor. The sub-motor may provide additional steering force to the steering wheel if it is determined that the aforementioned steering correction is required. As an example, in the main motor, the gear ratio of the worm and the worm wheel is 25:1, and in the sub-motor, the gear ratio of the worm and the worm wheel is 10:1.

That is, the main motor provides the reference torque for providing the driver's steering torque, and the sub-motor is used to provide the steering correction if required. Therefore, the functions of the two motors may be differentiated differently according to the conditions.

In the above description, it has been described a case of two motors as an example, but even if there are two or more motors, the present embodiment may be applied as long as the motors are configured to have different gear ratios.

Figure 2:
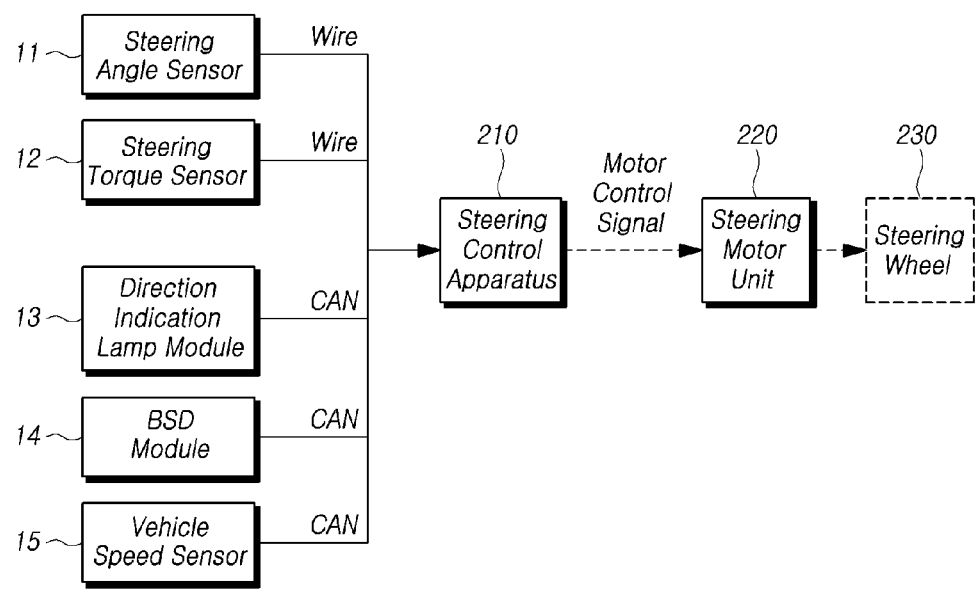
FIG. 2 is a diagram illustrating a configuration of a steering apparatus according to an embodiment of the present disclosure.

FIG. 2 is a diagram illustrating a configuration of a steering apparatus 200 according to an embodiment of the present disclosure. In the steering apparatus 200 of FIG. 2, the steering motor unit 220 includes one motor and one steering control apparatus 210.

The receiver of the steering control apparatus 210 receives steering correction condition information. Here, the steering correction condition information may include at least one of steering angle information, steering angular velocity information, and steering angle acceleration information from a steering angle sensor 11, steering torque information from a steering torque sensor 12, direction indicator information from a direction indication lamp module 13, BSD function operation information from a blind spot detection (BSD) module, and vehicle speed information from a vehicle speed sensor. The steering control apparatus 210 may be connected to the steering angle sensor 11 and a steering torque sensor 12 included in the steering device through a wire, and the steering control apparatus 210 may be connected to a vehicle control module outside the steering apparatus, for example, the direction indication lamp module, the BSD module and the vehicle speed sensor, etc. through CAN communication.

The steering correction determiner of the steering control apparatus 210 determines whether to perform the steering correction based on the received steering correction condition information, and if determining that the steering correction is to be performed, a angle correction value determiner of the steering control apparatus 210 determines a correction parameter of the steering correction condition information and calculates an angle correction value using the correction parameter of the steering correction condition information. Thereafter, the signal generator of the steering control apparatus 210 determines whether to generate a motor control signal based on the angle correction value according to a comparison result of the angle correction value and a reference value, and generates the motor control signal.

The steering control apparatus 210 transmits the generated motor control signal to the steering motor unit 220 to control the motor for steering correction. The steering motor unit 220 provides a steering force for steering correction to the steering wheel 230 based on a motor control signal from the steering control apparatus 210.

Figure 3:
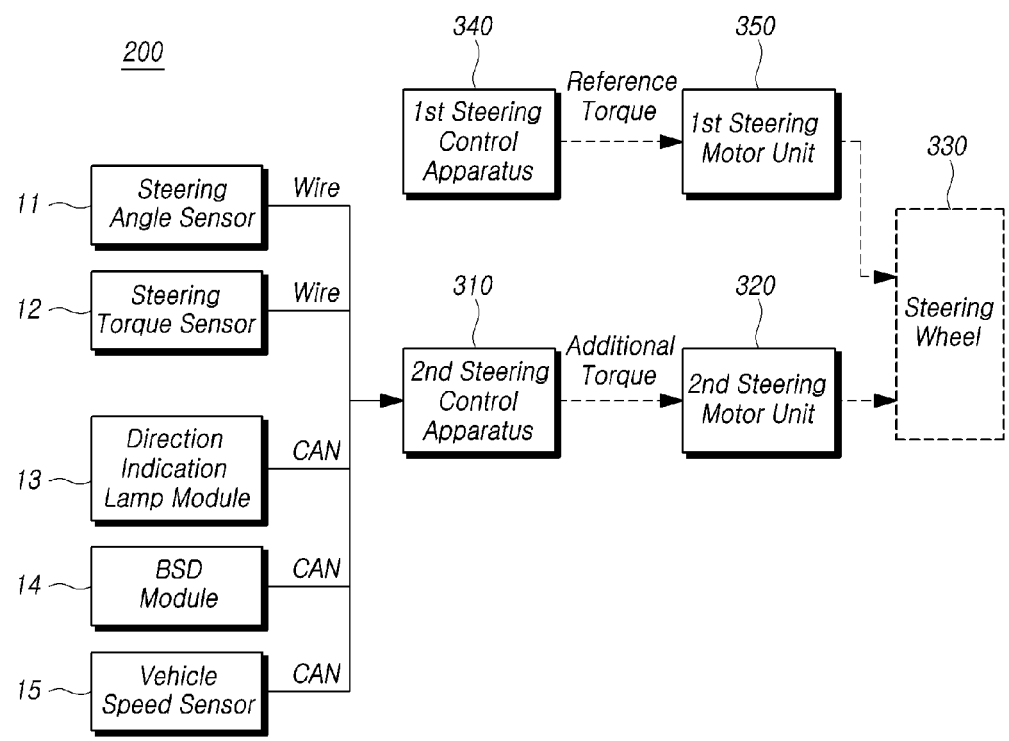
FIG. 3 is a diagram illustrating a configuration of a steering apparatus according to another embodiment of the present disclosure.

FIG. 3 is a diagram illustrating a configuration of a steering apparatus 300 according to another embodiment of the present disclosure. In the steering apparatus 300 of FIG. 3, the steering motor unit includes at least a first steering motor 350, a second steering motor 320, a first steering control apparatus 340 and a second steering control apparatus 310. Here, the gear ratios of a worm and a worm wheel connected to the first steering motor 350 and the second steering motor 320 are different from each other. The first steering motor 350 having a large gear ratio of the worm and the worm wheel may provide a reference torque for steering control as the main steering motor, and the second steering motor 320 having a small gear ratio of the worm and the worm wheel may provide additional torque for steering correction control as a sub-steering motor. In general steering, the first steering motor 350 as the main steering motor performs steering control, and the second steering motor 320 as a sub-steering motor may provide an additional steering force to the steering wheel 330 if it is determined that the aforementioned steering correction is required.

The second steering control apparatus 310 corresponds to the aforementioned steering control apparatus for steering correction control. Specifically, the receiver of the second steering control apparatus 310 receives steering correction condition information. Here, the steering correction condition information may include at least one of steering angle information, steering angular velocity information, and steering angle acceleration information from a steering angle sensor 11, steering torque information from a steering torque sensor 12, direction indicator information from a direction indication lamp module 13, BSD function operation information from a blind spot detection (BSD) module, and vehicle speed information from a vehicle speed sensor. The second steering control apparatus 310 may be connected to the steering angle sensor 11 and a steering torque sensor 12 included in the steering device through a wire, and the second steering control apparatus 310 may be connected to a vehicle control module outside the steering apparatus, for example, the direction indication lamp module, the BSD module and the vehicle speed sensor, etc. through CAN communication.

The steering correction determiner of the second steering control apparatus 310 determines whether to perform the steering correction based on the received steering correction condition information, and if determining that the steering correction is to be performed, the angle correction value determiner of the second steering control apparatus 310 determines a correction parameter of the steering correction condition information and calculates an angle correction value using the correction parameter of the steering correction condition information. Thereafter, the signal generator of the second steering control apparatus 310 determines whether to generate a motor control signal based on the angle correction value according to a comparison result of the angle correction value and a reference value, and generates the motor control signal.

The second steering control apparatus 310 transmits the generated motor control signal to the second steering motor unit 320 to control the motor for steering correction. The second steering motor unit 320 provides a steering force for steering correction to the steering wheel 330 based on a motor control signal from the second steering control apparatus 310.

Meanwhile, the angle correction value determiner of the steering control apparatus may determine a weight of the correction parameter of the steering correction condition information according to the steering correction condition information, and may calculate the angle correction value by using the correction parameter of the steering correction condition information and the determined weight.

Figure 4:
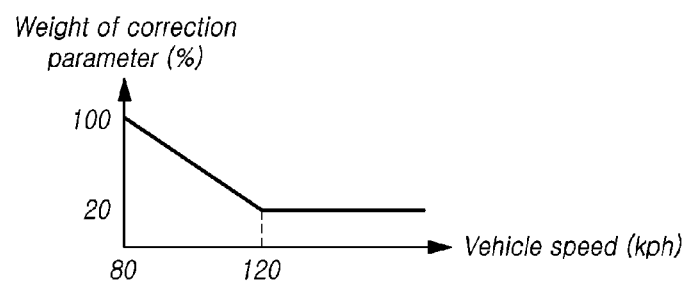
FIG. 4 is a weight graph of a correction parameter according to a vehicle speed of a vehicle according to an embodiment of the present disclosure.

FIG. 4 is a weight graph of a correction parameter according to a vehicle speed of a vehicle according to an embodiment of the present disclosure.

The steering control apparatus determines to perform the steering correction if the vehicle speed is equal to or greater than a first threshold, and determines a correction parameter for calculating the angle correction value and a weight of the correction parameter. In an embodiment, the steering control apparatus determines to perform steering correction if the vehicle speed is 80 kph. Referring to FIG. 4, the angle correction value determiner decreases the weight of the correction parameter for the vehicle speed if the vehicle speed is 80 kph or more and less than 120 kph, and maintains the weight of the correction parameter for the vehicle speed at a constant value if the vehicle speed is 120 kph or more. The reason of maintaining the weight of the correction parameter for the vehicle speed at a constant value even if the vehicle speed is 120 kph or higher is because it is required the steering correction for the vehicle speed since the steering angle or driving angle change due to the vehicle speed is large when the vehicle speed is high. Reference values such as 80 kph and 120 kph presented herein are not limited thereto, and may be determined according to actual application situations.

Figure 5:
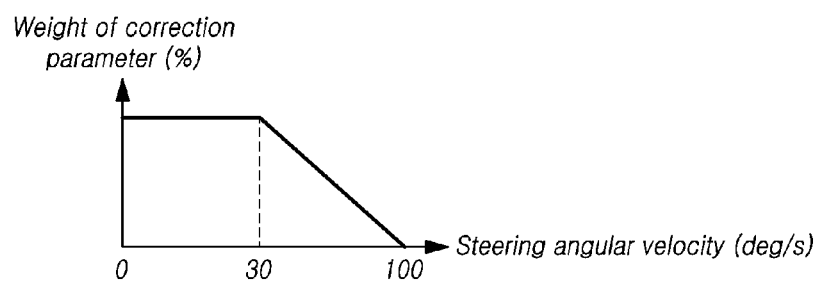
FIG. 5 is a weight graph of a correction parameter according to a steering angular velocity of a vehicle according to an embodiment of the present disclosure.

FIG. 5 is a weight graph of a correction parameter according to a steering angular velocity of a vehicle according to an embodiment of the present disclosure.

If it is determined to perform the steering correction, the steering control apparatus determines a correction parameter for calculating the angle correction value and a weight of the correction parameter. In an embodiment of FIG. 5, the angle correction value determiner maintains the weight of the correction parameter for the steering angular velocity at a constant value if the steering angular velocity is less than 30 deg/s, and decreases the weight of the correction parameter for the steering angular velocity if the steering angular velocity is 30 deg/s or more. If the steering angular velocity is 30 deg/s or higher, since it mean that the driver intends to change lanes or change the driving direction, the weight of the correction parameter of the steering angular velocity for steering correction is controlled to be small. A reference value such as 30 deg/s presented here is not limited thereto, and may be determined according to an actual application situation.

Figure 6:
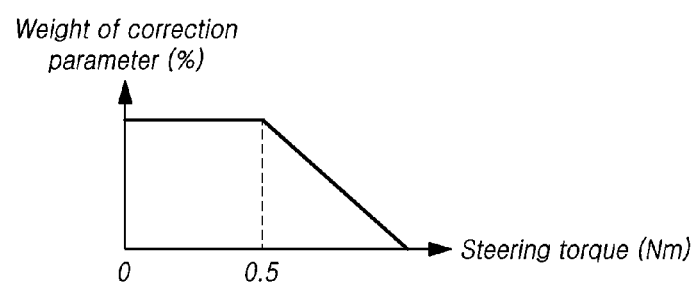
FIG. 6 is a weight graph of correction parameters according to steering torque of a vehicle according to an embodiment of the present disclosure.

FIG. 6 is a weight graph of correction parameters according to steering torque of a vehicle according to an embodiment of the present disclosure.

If it is determined to perform the steering correction, the steering control apparatus determines a correction parameter for calculating the angle correction value and a weight of the correction parameter. In an embodiment of FIG. 5, the angle correction value determiner maintains the weight of the correction parameter for the steering torque at a constant value if the steering torque is less than 0.5 Nm, and decreases the weight of the correction parameter for the steering torque if the steering torque included in the steering correction condition information is 0.5 Nm or more. If the steering torque of the vehicle is 0.5 Nm or more, since it means that the driver intends to change the lane or change the driving direction, the weight of the steering torque correction parameter for steering correction is controlled to be small. A reference value such as 0.5 Nm presented here is not limited thereto, and may be determined according to an actual application situation.

Figure 7:
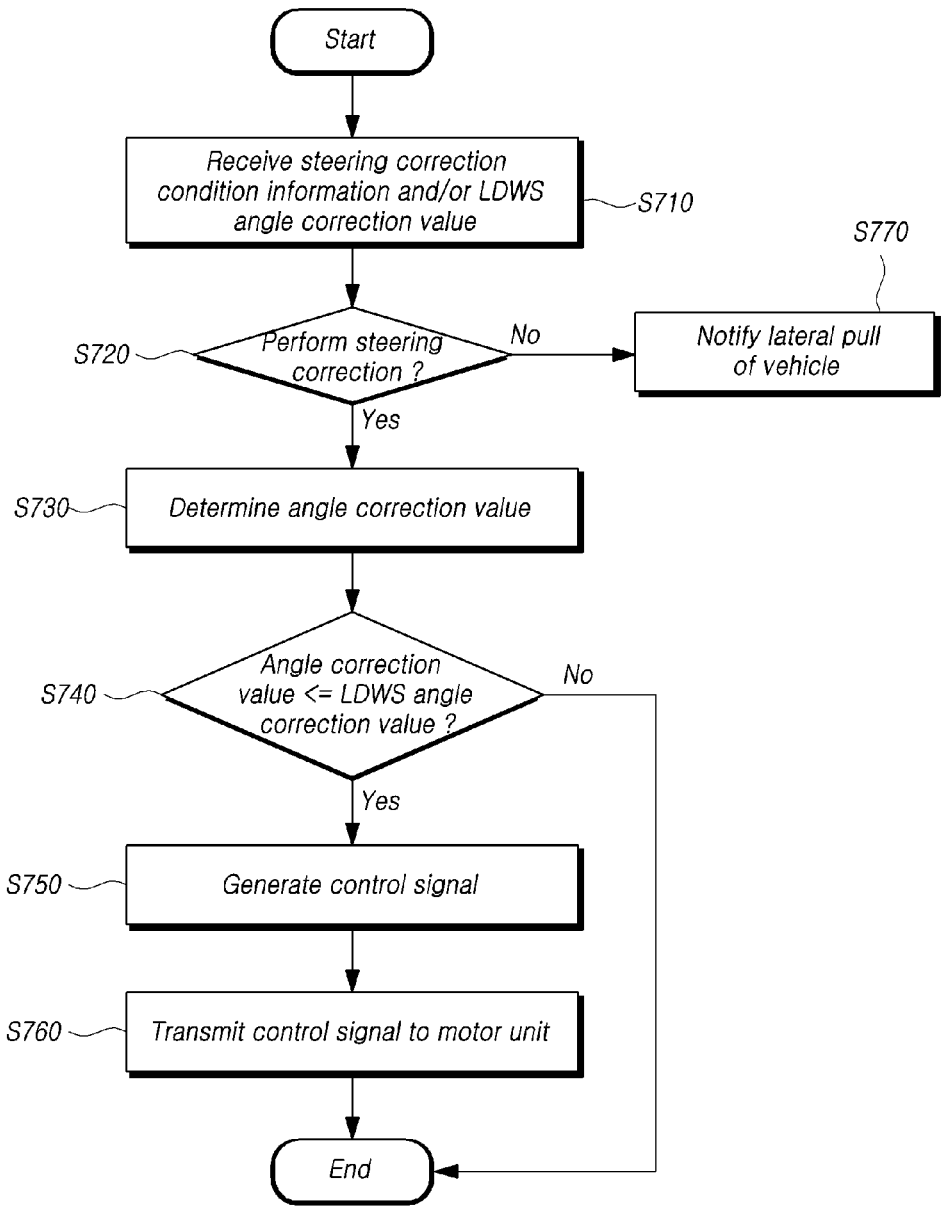
FIG. 7 is a flowchart illustrating a steering control method according to an embodiment of the present disclosure.

FIG. 7 is a flowchart illustrating a steering control method according to an embodiment of the present disclosure.

The steering control method may include a step of receiving steering correction condition information, a step of determining whether to perform steering correction based on the steering correction condition information, a step of determining, if it is determined that the steering correction is to be performed, a correction parameter of the steering correction condition information, and calculating an angle correction value using the correction parameter of the steering correction condition information, and a step of generating, according to the comparison result of the angle correction values and a reference values, a motor control signal by determining whether to generate the motor control signal based on the angle correction values.

In step of receiving, the steering control apparatus receives steering correction condition information and/or a LDWS angle correction value (S710). In an embodiment, the steering control apparatus may simultaneously receive steering correction condition information and the LDWS angle correction value. In another embodiment, the steering control apparatus may receive the steering correction condition information, and if it is determined to perform the steering correction thereafter, may additionally receive the LDWS angle correction value.

Here, the steering correction condition information may include at least one of steering angle information, steering angular velocity information, steering angular acceleration information, steering torque information, direction indicator information, blind spot detection (BSD) function operation information, or vehicle speed information. The steering angle information, the steering angular velocity information and the steering angular acceleration information may be information detected and processed by a steering angle sensor, the steering torque information may be information detected and processed by a steering torque sensor, the direction indicator information may be information on whether a turn signal lamp for changing a lane of a vehicle is turned on, the blind spot detection (BSD) function operation information may be information on whether the vehicle's blind spot detection function is activated, and the vehicle speed information may be information detected and processed by a vehicle speed sensor.

Optionally, the steering correction condition information may include information on the surrounding environment information of the vehicle captured by the vehicle's radar or camera, for example, information on the position or speed of objects existing in the vicinity of the vehicle, distance to the host vehicle, etc. The steering correction condition information is not limited thereto, and may include other vehicle information or external information that may be applied to steering control of the vehicle or may determine the steering intention of the driver.

In step of determining whether to perform steering correction, the steering control apparatus determines whether to perform the steering correction based on the steering correction condition information (S720). Specifically, the steering control apparatus determines whether to perform the steering correction based on at least one of steering angle information, steering angular velocity information, steering angular acceleration information, steering torque information, direction indicator information, BSD function operation information, and vehicle speed information. Here, the steering correction may means a correcting the steering of the vehicle so as for the vehicle to travel in the center of the driving lane or in a direction parallel to the driving lane if a lateral pull of the vehicle occurs in a specific direction of the driving lane against the driver's intention while driving.

In an embodiment, the steering control apparatus may determine to perform the steering correction if the direction indicator is not turned on, and may determine to not perform the steering correction if the direction indicator is turned on.

In an embodiment, the steering control apparatus may determine to perform the steering correction if the BSD function is in an on state, and may determine to not perform the steering correction if the BSD function is in an off state.

In an embodiment, the steering control apparatus may determine to perform the steering correction if the vehicle speed is equal to or greater than the first threshold value, and may determine to not perform the steering correction if the vehicle speed is less than the first threshold value.

In the case that the steering control apparatus determines to not perform the steering correction in step of determining whether to perform steering correction, the steering control apparatus may provide a warning notification for the lateral pull of the vehicle. The warning notification for the lateral pull of the vehicle may use at least one of a vehicle steering wheel vibration, a driver's seat vibration, a sound notification, and a notification using visual information. However, the warning notification is not limited thereto, and there may be utilized any method capable of drawing the driver's attention or providing the driver with a notification about the lateral pull of the vehicle.

In the steering wheel vibration of a vehicle, it is possible to prevent system resonance by using a notch filter corresponding to the steering wheel vibration frequency. Furthermore, it is possible to adjust the gain of the steering wheel vibration by varying the amplitude, frequency, and period to meet the characteristics of each vehicle. In addition, the amplitude of the steering wheel vibration may be adjusted based on the steering torque information. For example, the amplitude of the vibration may be ramped down as the steering torque is increased.

The steering control apparatus may transmit a warning notification about the lateral pull of the vehicle through a CAN signal command. In one embodiment, if the steering control apparatus 100 determines that a warning notification for lateral pull of the vehicle is necessary without steering correction control, a lane departure warning system (LDWS) module may generate the CAN signal command and transmits it to the relevant module, thereby providing the warning notification about the lateral pull of the vehicle.

In an embodiment, if the vehicle speed is greater than the second threshold and less than the first threshold, the steering control apparatus may provide a warning notification for lateral pull of the vehicle. Here, the second threshold is set to a value smaller than the first threshold.

In an embodiment, the steering correction determiner 120 of the steering control apparatus 100 may not perform steering correction and a warning notification for lateral pull of the vehicle if the vehicle speed is less than or equal to the second threshold.

In the case that the steering control apparatus determines to perform the steering correction in step of determining whether to perform steering correction, the steering control apparatus determines a correction parameter of the steering correction condition information and calculates an angle correction value using the correction parameter of the steering correction condition information (S730). The correction parameter of the steering correction condition information may be determined as a preset correction parameter. Alternatively, the correction parameter of the steering correction condition information may be determined as a correction parameter corresponding to the driving state of the vehicle. The correction parameter may include at least one of a steering angle, a steering angular velocity, a steering angular acceleration, a steering torque, and a vehicle speed. The steering control apparatus may calculate the angle correction value by using the determined correction parameter.

In an embodiment, the steering control apparatus may determine a weight of the correction parameter of the steering correction condition information according to the steering correction condition information, and may calculate the angle correction value by using the correction parameter of the steering correction condition information and the determined weight. The weight of the correction parameter determines the degree to which steering correction is performed based on the driving state of the host vehicle. The weight of the correction parameter may be determined based on a relation to a weight value of the correction parameter according to a preset weight map or preset information on the corresponding steering correction condition of the host vehicle.

In an embodiment, the steering control apparatus may decrease the weight of the correction parameter of the vehicle speed if the vehicle speed included in the steering correction condition information is equal to or greater than a first threshold and less than a third threshold. In Contrary, if the vehicle speed is equal to or greater than the third threshold, the steering control apparatus may maintain the weight of the correction parameter of the vehicle speed as a constant value. Here, the third threshold is set to a value greater than the first threshold.

In an embodiment, if the steering angular velocity included in the steering correction condition information is less than a fourth threshold, the steering control apparatus may maintain the weight of the correction parameter of the steering angular velocity at a constant value. In contrary, if the steering angular velocity included in the steering correction condition information is equal to or greater than the fourth threshold, the steering control apparatus may decrease or reduce the weight of the correction parameter of the steering angular velocity.

In an embodiment, the steering control apparatus may maintain the weight of the correction parameter for the steering torque at a constant value if the steering torque included in the steering correction condition information is less than a fifth threshold value, and may decrease or reduce the weight of the correction parameter for the steering torque if the steering torque included in the steering correction condition information is equal to or greater than the fifth threshold.

The steering control apparatus compares the calculated angle correction value with a reference value. Specifically, the steering control apparatus compares the angle correction value with a LDWS angle correction value, and determines whether the angle correction value is equal to or less than the LDWS angle correction value (S740).

If the steering control apparatus determines that the angle correction value is equal to or less than the LDWS angle correction value, the steering control apparatus generates a motor control signal based on the angle correction value (S750). The motor control signal may be a torque or current provided to the steering motor unit to correct steering of the vehicle. Since the steering motor unit is controlled by a motor control signal based on the angle correction value if the angle correction value is less than or equal to the LDWS angle correction value, it is possible to realize the precise steering control by reflecting the driving state of the vehicle rather than the LDWS indication value. If the steering control apparatus determines that the angle correction values are not equal to or less than the LDWS angle correction values, the steering control apparatus terminates without performing a separate steering correction. If the angle correction value is not equal to or less than the LDWS angle correction value, since it is determined that the driver intents to change the lane of the vehicle or change the driving direction, and therefore, separate steering correction is not performed.

The steering control apparatus transmits the generated motor control signal to the steering motor unit (S760).

In one embodiment, the steering motor unit may include at least two motors, and a gear ratio of a worm and a worm wheel connected to each of the at least two motors may be different from each other, and the steering control apparatus may transmit the motor control signal to a motor having the smallest gear ratio. Here, the motor having a large gear ratio of the worm and the worm wheel may provide a reference torque for steering control as the main motor, and the motor having the small gear ratio of the worm and the worm wheel may provide additional torque for steering correction control as a sub-motor. The sub-motor may provide additional steering force to the steering wheel if it is determined that the aforementioned steering correction is required. As an example, in the main motor, the gear ratio of the worm and the worm wheel is 25:1, and in the sub-motor, the gear ratio of the worm and the worm wheel is 10:1.

The terms "system", "processor", "controller", "component", "module", "interface", "model", "unit", etc. described above generally may mean a computer-related entity hardware, a combination of hardware and software, software, or software in execution. For example, the aforementioned components may be, but are not limited to, a process run by a processor, a processor, a controller, a controlling processor, an object, a thread of execution, a program, and/or a computer. For example, both an application running on a controller or processor and a controller or processor can be a component. One or more components may reside within a process and/or thread of execution, and components may be located on one system or distributed across two or more systems.

The terms such as "include", "comprise" or "have" described above mean that, unless otherwise stated, the corresponding component can be embedded, and it should be understood that the component does not exclude other components, but may further include other components. All terms, including technical and scientific terms, have the same meaning as commonly understood by one of ordinary skill in the art to which this disclosure belongs, unless otherwise defined. Commonly used terms, such as those defined in the dictionary, should be interpreted as being consistent with the meaning of the context of the related art, and should not be interpreted in an ideal or excessively formal meaning unless explicitly defined in the present disclosure.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

A described above, Korean Patent Application No. 10-2018-0164991 filed in Korea on Dec. 19, 2018 is incorporated into this patent application by reference. In addition, if this patent application claims priority for countries other than the United States for the same reason as above, all the contents are incorporated into this patent application as references.

The invention claimed is:

1. A steering control apparatus comprising:
a receiver for receiving steering correction condition information;
a steering correction determiner for determining whether to perform steering correction based on the steering correction condition information;
an angle correction value determiner for, if it is determined to perform the steering correction, determining a correction parameter of the steering correction condition information, and for calculating an angle correction value using the correction parameter of the steering correction condition information; and
a signal generator for, according to the comparison result of the angle correction values and a reference values, determining whether to generate a motor control signal based on the angle correction values to generate the motor control signal,
wherein the angle correction value determiner determines a weight of the correction parameter of the steering correction condition information according to the steering correction condition information, and calculates the angle correction value using the correction parameter of the steering correction condition information and the determined weight, and
wherein the angle correction value determiner decreases the weight of the correction parameter for a vehicle speed if the vehicle speed included in the steering correction condition information is equal to or greater than a first threshold and less than a third threshold, and maintains the weight of the correction parameter for the vehicle speed as a constant value if the vehicle speed is equal to or greater than the third threshold.

2. The steering control apparatus of claim 1, further comprising a signal transmitter for transmitting the generated motor control signal to a steering motor unit,
wherein the steering motor unit includes at least two motors, and gear ratios of a worm and a worm wheel connected to each of the at least two motors are different.

3. The steering control apparatus of claim 2, wherein the signal transmitter transmits the motor control signal to only one of the at least two motors.

4. The steering control apparatus of claim 2, wherein the signal transmitter transmits the motor control signal to a motor having the smallest gear ratio among the at least two motors.

5. The steering control apparatus of claim 1, wherein the steering correction condition information includes at least one of steering angle information, steering angular velocity information, steering angular acceleration information, steering torque information, direction indicator information, blind spot detection (BSD) function operation information, or vehicle speed information.

6. The steering control apparatus of claim 5, wherein the steering correction determiner determines to perform the steering correction if the direction indicator is not turned on, and determines to not perform the steering correction if the direction indicator is turned on.

7. The steering control apparatus of claim 5, wherein the steering correction determiner determines to perform the steering correction if the BSD function is in a on state, and determines to not perform the steering correction if the BSD function is in a off state.

8. The steering control apparatus of claim 5, wherein the steering correction determiner determines to perform the steering correction if a vehicle speed is equal to or greater than a first threshold, and determines to not perform the steering correction if the vehicle speed is less than the first threshold.

9. The steering control apparatus of claim 8, wherein the steering correction determiner provides a warning notification regarding a lateral pull of a vehicle.

10. The steering control apparatus of claim 1, wherein the angle correction value determiner maintains the weight of the correction parameter for a steering angular velocity as a constant value if the steering angular velocity included in the steering correction condition information is less than a fourth threshold, and decreases the weight of the correction parameter for the steering angular velocity if the steering angular velocity is equal to or greater than the fourth threshold.

11. The steering control apparatus of claim 1, wherein the angle correction value calculator maintains the weight of the correction parameter for a steering torque at a constant value if the steering torque included in the steering correction condition information is less than a fifth threshold, and decreases the weight of correction parameter for the steering torque if the steering torque included in the steering correction condition information is equal to or greater than the fifth threshold.

12. The steering control apparatus of claim 1, wherein the receiver receives a LDWS angle correction value from a lane departure warning system (LDWS) module, and
wherein the signal generator generates the motor control signal based on the angle correction values if the angle correction values are equal to or less than the LDWS angle correction values.

13. A steering control method comprising:
receiving steering correction condition information;
determining whether to perform steering correction based on the steering correction condition information;
determining, if it is determined to perform the steering correction, a correction parameter of the steering correction condition information, and calculating an angle correction value using the correction parameter of the steering correction condition information; and
generating, according to the comparison result of the angle correction values and a reference values, a motor control signal by determining whether to generate the motor control signal based on the angle correction values,
wherein the calculating of the angle correction value comprises determining a weight of the correction parameter of the steering correction condition information according to the steering correction condition information, and calculating the angle correction value using the correction parameter of the steering correction condition information and the determined weight, and
wherein the determining of the weight of the correction parameter comprises decreasing the weight of the correction parameter for a vehicle speed if the vehicle speed included in the steering correction condition information is equal to or greater than a first threshold and less than a third threshold, and maintaining the weight of the correction parameter for the vehicle speed as a constant value if the vehicle speed is equal to or greater than the third threshold.

14. The steering control method of claim 13, wherein the steering correction condition information includes at least one of steering angle information, steering angular velocity information, steering angular acceleration information, steering torque information, direction indicator information, blind spot detection (BSD) function operation information, or vehicle speed information.

15. The steering control method of claim 13, further comprising transmitting the generated motor control signal to a steering motor unit,
   wherein the steering motor unit includes at least two motors, and gear ratios of a worm and a worm wheel connected to each of the at least two motors are different, and
   wherein the motor control signal is transmitted to a motor having the smallest gear ratio among the at least two motors.

16. A steering apparatus comprising:
   a steering motor including at least two motors configuring to have different gear ratios of a worm and a worm wheel; and
   an electronic control unit for controlling the steering motor;
   wherein the electronic control unit configuring to,
      receive steering correction condition information,
      determine whether to perform steering correction based on the steering correction condition information,
      determine, if it is determined to perform the steering correction, a correction parameter of the steering correction condition information, and calculate an angle correction value using the correction parameter of the steering correction condition information, and
      generate, according to the comparison result of the angle correction values and a reference values, a motor control signal by determining whether to generate the motor control signal based on the angle correction value,
   wherein the motor control signal is transmitted to a motor having the smallest gear ratio among the at least two motors,
   wherein the electronic control unit is configured to determine a weight of the correction parameter of the steering correction condition information according to the steering correction condition information, and calculates the angle correction value using the correction parameter of the steering correction condition information and the determined weight, and
   wherein the electronic control unit is configured to decrease the weight of the correction parameter for a vehicle speed if the vehicle speed included in the steering correction condition information is equal to or greater than a first threshold and less than a third threshold, and maintain the weight of the correction parameter for the vehicle speed as a constant value if the vehicle speed is equal to or greater than the third threshold.

* * * * *